Nov. 14, 1961  T. L. FLANAGAN ET AL  3,008,338
VARIABLE SPEED PULLEY MECHANISM
Filed Jan. 22, 1960  2 Sheets-Sheet 1

INVENTORS
Thomas L. Flanagan, Robert P. Neff
and Kenneth Wayne Slipp
BY Rockwell & Bartholow
ATTORNEYS Nov. 14, 1961 T. L. FLANAGAN ET AL 3,008,338
VARIABLE SPEED PULLEY MECHANISM
Filed Jan. 22, 1960 2 Sheets-Sheet 2

INVENTORS
Thomas L. Flanagan, Robert P. Neff
and Kenneth Wayne Slipp
BY Rockwell & Bartholow
ATTORNEYS 3,008,338
VARIABLE SPEED PULLEY MECHANISM
Thomas L. Flanagan, Robert P. Neff, and Kenneth Wayne Slipp, Killingworth, Conn., assignors to Killingworth Engineers, Inc., Killingworth, Conn., a corporation of Connecticut
Filed Jan. 22, 1960, Ser. No. 4,147
4 Claims. (Cl. 74—230.17)

This invention relates to a variable speed pulley mechanism which, while not limited thereto, is particularly suitable for use on industrial sewing machines. Industrial sewing machines operate at speeds far in excess of the speeds obtained by home sewing machines, making it difficult for one to learn to sew on industrial machines. The instant pulley mechanism, when employed on an industrial sewing machine, enables one to slow the machine while learning industrial sewing techniques. The pulley mechanism is of the type which includes V belts running over opposed conical faces of opposite pulley sections mounted for relative axial adjustments to vary the effective diameters of the sections, so as to change the speed of the belts. The variable speed mechanism, like most mechanisms of this type, is adapted to be interposed between a source of power, such as a motor, and a load to be driven from the motor to vary the speed ratio between the motor and the load.

One object of the invention is to provide a variable speed pulley mechanism to obtain a relatively great speed ratio between the driving and the driven members.

Another object is to provide a speed-changing mechanism which is very compact and which is constituted by few and simple parts.

A further object is to provide a pulley mechanism in which pulleys are arranged in a triangular relation near the driving shaft.

Still another object is to provide a mechanism having a wide range of pulley adjustments to enable the belts to be tightened when necessary.

Figure 5:
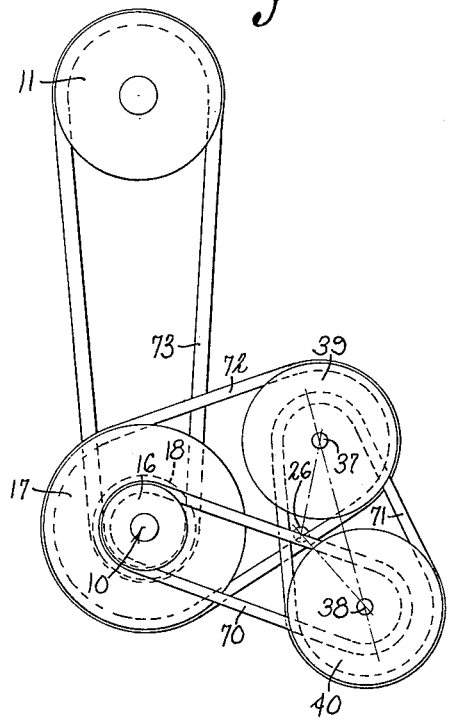
FIG. 5 is a diagrammatic view of the pulleys and belts of the mechanism.

With particular reference to FIG. 5, there is shown in the drawings a driving shaft 10 drivingly connected to a load which may be a fly wheel or pulley 11 operatively associated with an industrial sewing machine, not shown. The driving connection between the shaft 10 and the pulley 11 will be described in detail hereinafter.

Figure 1:
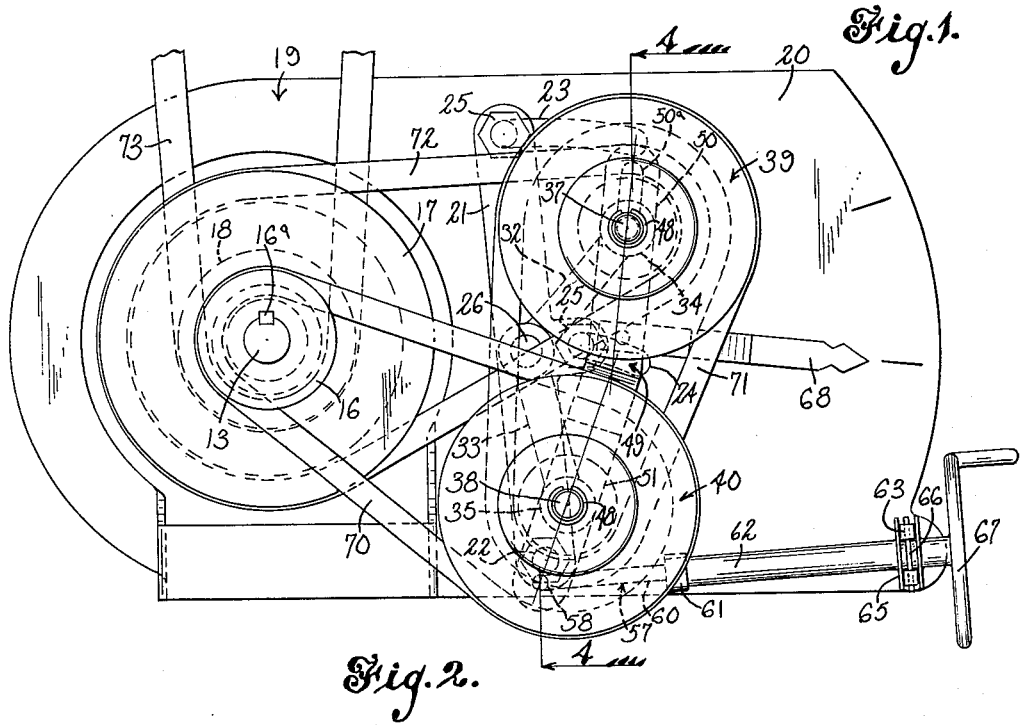
FIG. 1 is a side elevational view of a variable speed pulley mechanism embodying the invention.
Figure 2:
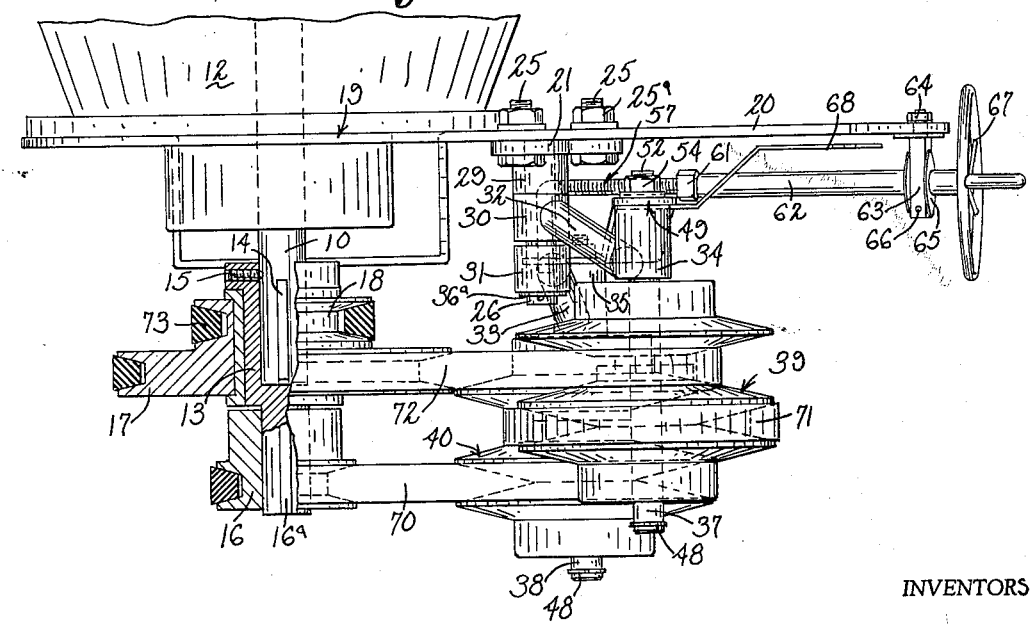
FIG. 2 is generally a top plan view, but illustrates certain parts of the mechanism in horizontal section.

In the form shown in the drawings by way of example, the shaft 10 is driven directly from an electric motor 12 of which the shaft forms a part. As best shown in FIG. 2, a hub 13 is keyed to the shaft 10 as at 14. The hub is removably held on the shaft by a screw 15. The outer projecting end of the hub 13 is of reduced diameter and is received in the hub portion of a V-groove pulley 16 keyed (FIG. 1) to the hub 13, as at 16ª. The pulley 16 is the driving pulley and is connected to a V-groove pulley 17 rotatable on the hub 13 through the variable speed pulley mechanism. The pulley 17 has fixed thereto in concentric relation a smaller V-groove pulley 18 which is also rotatable on the hub 13, the pulley 18 being belt-connected to the load, that is, the pulley 11, which is also of the V-groove type. It should be noted that the pulley 16, hereinafter referred to as the output pulley, is in concentric relation and adjacent the pulley 18, hereinafter referred to as the input pulley.

The variable speed pulley mechanism, to be described hereinafter, may be supported from the motor casing by a flange 19 (FIG. 2) rigidly connected to the motor casing in any suitable manner, the flange extending to one side of the casing. The flange 19, hereinafter referred to as a support, is vertically arranged and has a plate portion 20. A vertically arranged strap-like bracket 21 has the lower end thereof pivoted to the lower part of the plate portion 20 by a bolt 22 extending through the bracket 21 and the portion 20 and secured by a nut 22ª. The plate portion 20 is provided with an arcuate slot 23 (FIG. 3) and an arcuate slot 24, these slots being formed on radii of different lengths originating at the pivot point of the bracket 21. Bolts 25 extend through the bracket and the respective slots limiting pivotal adjustment of the bracket, the bolts 25 being provided with nuts 25ª to clamp the bracket to the plate portion in the desired angularly adjusted position.

Figure 4:
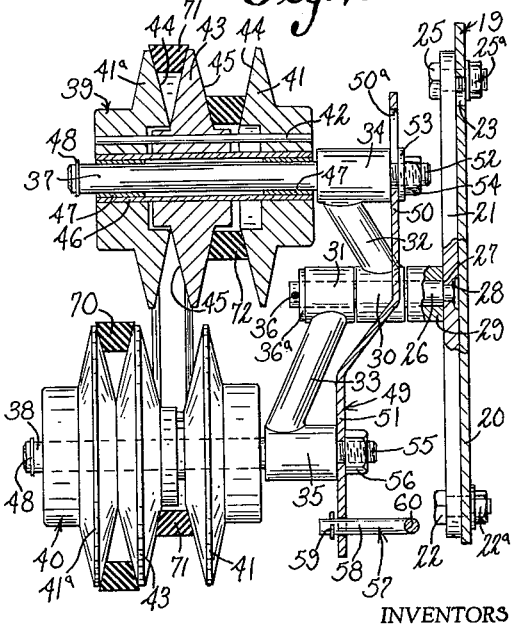
FIG. 4 is a sectional view taken on line 4—4 of FIG. 1.

Approximately midway between the ends thereof, the bracket 21 is provided with a pivot pin 26 extending horizontally, as shown in FIG. 4. The pin 26 is shouldered, as at 27, to abut one face of the bracket 21, and the pin has a reduced portion extending into the bracket 21 from the shoulder 27, which reduced portion is peened over, as at 28, and countersunk so that the pin is rigidly supported on the bracket. As shown in FIG. 4, a spacer 29 embraces the pivot pin 26 and abuts the bracket. Adjacent the spacer 29, a collar 30 embraces the pivot pin 26, and adjacent and outwardly of the collar 30, the pin is embraced by a collar 31. The collars 30 and 31 are rotatable on the pin and are provided with projecting arms 32 and 33, respectively. The distal ends of the arms 32 and 33, which are of like shape and dimensions, are provided with collars 34 and 35, respectively, fixed thereto. To prevent the collars 30 and 31 from slipping off the pivot pin 26, a cotter pin 36 extends through the outer end of the pin and overlies a washer 36ª.

Stub shafts 37 and 38 are provided and are received in the collars 34 and 35, respectively. The stub shafts are arranged in parallel and lapping relation, as shown in FIG. 4. As shown in this view, the shaft 37 supports a multi-section pulley indicated generally at 39, and the shaft 38 supports a multi-section pulley indicated generally at 40, the pulleys 39 and 40 being of like construction. The pulley units 39 and 40 are each made up of three pulley flanges, that is, inner and outer flanges 41 and 41ª, respectively, fixed to one another by a tie pin 42, and a cooperating intermediate pulley flange 43 mounted coaxially with the inner and outer flanges 41 and 41ª for axial adjustment with respect to the last-named flanges. The pulley flanges 41 and 41ª have radially outwardly diverging conical surfaces 44. The cooperating intermediate pulley flange 43 is provided with radially inwardly diverging conical surfaces 45.

As shown in FIG. 4, the flanges of the pulley 39 are supported from the stub shaft 37 through a sleeve 46. The sleeve embraces axially spaced apart bushings 47 which receive the stub shaft 37. The pulley 40 is of like construction. The multi-section pulley units 39 and 40 are axially slidable on the respective stub shafts, and to prevent the pulleys from slipping off the outer ends of these shafts, each shaft is provided with a split ring 48 at its outer end. The construction and arrangement of each pulley unit is such that the pulley may be self-adjusting in an axial direction on the corresponding stub shaft in accordance with the run of the belts. It will be further understood that the intermediate pulley flange 43 of each pulley unit is adjustable axially by belt movements and is slidable on the corresponding tie pin 42 and the sleeve 46.

The multi-section pulley units 39 and 40 are interconnected through a metal strap, indicated generally at 49, having a portion 50 offset from a portion 51 thereof. The inner end of the stub shaft 37 (FIG. 4) is threaded and extends through a slot 50ª arranged lengthwise of the strap 49 in the portion 50 thereof. The stub shaft is in effect integral with the collar 34 and, if desired, the collar 34 may be formed as a part of the shaft 37. However, the shaft 37 may have the threaded end portion thereof threaded into the collar 34. The projecting inner end of the threaded portion, indicated at 52, may be embraced by a washer 53 and be received in a nut 54 to clamp the collar 34 against the strap 49. The construction and arrangement of the shaft 38 and the collar 35 may be similar. As shown in FIG. 4, the stub shaft 38 has a threaded inner end portion 55 projecting through the strap portion 51, and the collar 35 is clamped to the strap portion 51 by a nut 56 on the threaded portion 55 of the shaft. It will be manifest from the foregoing that the strap 49 serves to maintain the pulley-supporting arms 32 and 33 in fixed angular relation to one another. It will also be appreciated, however, that the angle formed by the supporting arms 32 and 33 may be varied to adjust the pulley units 39 and 40 relatively toward or away from one another by loosening the nut 54 and adjusting the stub shaft 37 in slot 50ª. The last-mentioned nut is retightened after this adjustment is made.

Figure 3:
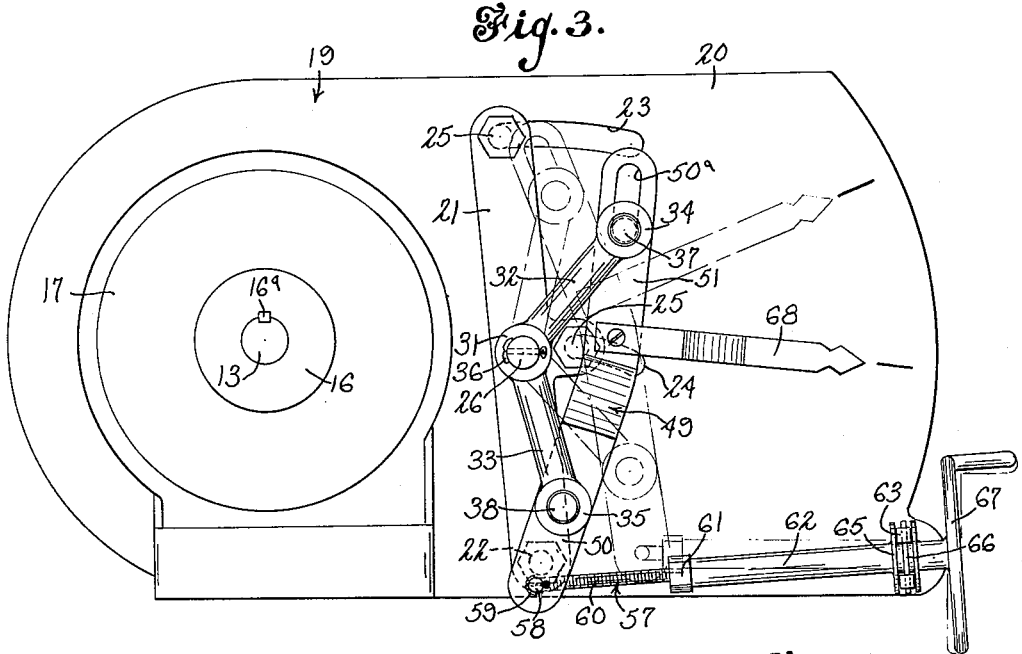
FIG. 3 is a view generally similar to FIG. 1, but illustrates the mechanism with the change-speed pulleys and the belts removed.

The pulley units 39 and 40, which are interconnected by the strap 49, are mounted on the pivot pin 26 for adjustment with one another in a vertical plane. To effect adjustment, which may be clockwise or counterclockwise, a screw member, indicated generally at 57, is provided. The last-named member, which may be L-shaped, has an arm 58 (FIG. 4) extending through the lower end of the strap 49 and prevented from separation therewith by a cotter pin 59. The arm 60 (FIG. 3) of the member 57 is threaded and received in a nut 61 fixed to one end of a tube 62, the arm 60 extending into the tube. The tube 62 is rotatably supported and axially fixed in a fork member 63 having a threaded portion extending through the plate portion of the flange 19 for support (FIG. 2) and received in a nut 64. The tube 62 may be provided with radial bearing flanges 65 bearing against opposite faces of the fork member 63. The tube 62 may be removably held in the fork member 63 by a pin 66 (FIG. 3) extending through the tines of the fork member. The end of the tube 62 remote from the nut 61 is provided with a hand wheel 67 to effect rotary movement of the tube and the nut. It will be manifest from the foregoing that when the hand wheel 67 is rotated in one direction, pulley-supporting arms 32 and 33 are rotated together on the axis of the pivot pin 26 from the full-line positions thereof shown in FIG. 3 to the broken-line positions shown in this view, the movement being a counterclockwise movement. When the hand wheel 67 is rotated in the other direction, the pulley-supporting arms are rotated in a clockwise direction. To give a visual indication of the angular positions of the pulley units when the units are adjusted simultaneously through movement of the screw member 57, a pointer 68 may be fixed to the central portion of the strap 49 to project laterally therefrom. The pointer 68 may register with suitable indicia on the plate portion 20 of the flange 19, as shown in FIG. 3.

The driving connections of the variable speed mechanism are as follows. An endless belt 70, of the well-known V type, is trained over the output pulley 16 and extends between the opposed conical surfaces 44 and 45 of the outer pulley flange 41ª and the intermediate pulley flange 43 of the pulley 40. A similar belt 71 is disposed between the opposed conical surfaces 45 and 44 of the intermediate pulley flange 43 and the inner pulley flange 41 of the pulley unit 40, the belt 71 also extending between the opposed conical surfaces 44 and 45 of the outer pulley flange 41ª and the intermediate pulley flange 43 of the pulley unit 39. A similar belt 72 extends between the opposed conical surfaces 45 and 44 of the intermediate pulley flange 43 and the inner pulley flange 41 of the pulley unit 39. The last-named belt is trained over the pulley 17 which, as previously indicated, is in fixed and concentric relation to the input pulley 18. A belt 73, which may be similar to the aforementioned belts, is trained over the input pulley 18 and connects this pulley to the loads which, in the illustrated form, is indicated as the pulley 11, the belt 73 being trained over the pulley 11.

The operation of the variable speed pulley mechanism will be manifest from the foregoing description. When it is desired to reduce the speed of the input pulley 18, the hand wheel 67 is rotated in a direction to swing the pulley units 39 and 40 simultaneously in a clockwise direction. This movement of the pulley units draws the belt 72 radially inwardly between the inner pulley flange 41 and the intermediate pulley flange 43 of the pulley unit 39, thereby shifting the intermediate pulley flange axially in an outward direction. This movement of the last-named pulley flange shifts the belt 71 radially outwardly between the last-named flange and the outer pulley flange 41ª of the pulley 39. This movement effects movement of the belt 71 radially inwardly between the inner pulley flange 41 and the intermediate pulley flange 43 of the pulley unit 40, thereby shifting the last-named flange axially outward. Outward movement of the last-named pulley flange effects radially outward movement of the belt 70 between the intermediate pulley flange 43 and the outer pulley flange 41ª of the pulley unit 40. These belt movements reduce the speed of the input pulley 18. It will be understood from the foregoing that these belt movements are reversed to increase the speed of the input pulley 18 when the hand wheel 67 is rotated in a direction to swing the pulley units 39 and 40 in a counterclockwise direction as viewed in FIG. 3.

The speed ratio obtainable with the mechanism varies, of course, with the diameters of the pulleys employed in the mechanism. However, it has been found that when pulleys of a relatively small diameter are employed in such a mechanism, a speed ratio of from 1 to 5 may be obtained. To achieve optimum performance, the belts should be properly adjusted. The belt 70 is properly adjusted to achieve maximum speed of the input pulley 18 when the belt 70 runs radially inwardly on the pulley unit 40 as far as permissible by the construction of the pulley flanges 41ª and 43. The belt 72 is properly adjusted to slow the input pulley 18 as far as possible when the belt 72 runs radially inwardly on the pulley unit 39 as far as permissible by the construction of the pulley flanges 41 and 43. To tighten the belts 70 and 72, the nuts 22ª and 25ª which secure the bracket 21 in angular position on the flange 19 are first loosened. The bracket 21 is then rotated in a clockwise direction as viewed in FIG. 1. The tendency is for this movement of the bracket to tighten the belt 72 more than the belt 70. However, when the belt 72 is very tight, the nuts 22ª and 25ª may be retightened, and to further tighten the belt 70, the hand wheel 67 may be manipulated to rotate the pulley units 39 and 40 in a direction to ease, to some extent, the tension on the belt 72 and increase the tension on the belt 70. To tighten the belt 71, the nut 54 on the stub shaft 37 may be loosened to permit the pulley supporting arm 32 to be swung away from the pulley supporting arm 33, the shaft moving in the slot 51 formed in the bracket 49. The nut may then be retightened.

In accordance with the foregoing disclosure there is provided a variable speed pulley mechanism to obtain a relatively great speed ratio between the driving and the driven members. The mechanism, which as previously indicated is especially useful when associated with industrial sewing machines, is very compact and is constituted by few and simple parts. The mechanism is especially compact due to the triangular arrangement of pulleys employed in the mechanism. A further advantage of the pulley mechanism resides in the feature of a wide range of belt adjustments permissible with the use of the mechanism.

While only one form of the variable speed mechanism has been illustrated in the drawings and described above, it will be apparent to those versed in the art that the mechanism may take other forms and is susceptible of various changes in details without departing from the principles of the invention and the scope of the appended claims.

What we claim is:

1. In a variable speed power take-off for a driving shaft, an output V-belt pulley fixed to the shaft, an input pulley, a support, first and second parallel pulley units, each comprising an axially spaced pair of inner and outer pulley flanges and an intermediate pulley flange, a pair of pulley shafts extending through the respective pulley flanges, the inner and outer pulley flanges of each unit being in fixed relation to one another, and the intermediate pulley flange being axially slidable toward and away from the inner and outer flanges in angularly fixed relation thereto to form a pair of variable diameter pulley elements defining V grooves, a first V belt connecting said output pulley to one pulley element of the one pulley unit, a second V belt connecting the other pulley element of the last-mentioned pulley unit to one element of the other pulley unit, means including a third V belt connecting the other pulley element of said other pulley unit to said input pulley, a bracket of strap-like form having one end thereof pivotally mounted on said support for swinging movement of the bracket toward and away from the driving shaft, the bracket having means co-acting with means on said support to limit pivotal movement of the bracket and to hold the latter in an angularly adjusted position, a pivot carried by said bracket in parallel relation to the pulley units, a pair of arms carrying the respective pulley shafts and mounted on said pivot, a metal strap extending between the pulley shafts to maintain the latter in spaced relation to each other, one of the shafts being adjustable on the last-mentioned strap to permit the pulley shafts to be adjusted toward or away from each other, the pulley shafts being swingable in unison on said pivot to swing one pulley unit toward the driving shaft as the other swings away, and screw means connected to the last-named strap for effecting pivotal adjustment of the pulley units on said pivot.

2. In a variable speed power take-off for a driving shaft having a fixed axis, an output V-belt pulley fixed to the shaft, a V-belt pulley of larger diameter in revoluble and concentric relation to the shaft, an input V-belt pulley of smaller diameter than said pulley in revoluble relation to the shaft and in fixed and concentric relation to the last-mentioned pulley, a support, first and second parallel pulley units forming with said pulley in revoluble relation to the shaft a pulley triangle, each of said pulley units comprising an axially spaced pair of inner and outer cone-faced pulley flanges and an intermediate double cone-faced pulley flange, a pair of pulley shafts extending through the respective pulley flanges, the inner and outer pulley flanges of each unit being in fixed relation to one another and the intermediate pulley flange being axially slidable toward and away from the inner and outer flanges in angularly fixed relation thereto to form a pair of axially spaced variable diameter belt grooves of V shape, a first V belt connecting said output pulley to one V groove of one pulley unit, a second V belt connecting the other V groove of the last-mentioned pulley unit to one V groove of the other pulley unit, a third V belt connecting the other V groove of said other pulley unit to said pulley in revoluble relation to the shaft, means pivotally mounting the shafts of the pulley units on said support for swinging movement in unison to swing one pulley unit toward the driving shaft as the other swings away, and means for effecting pivotal adjustment of the last-mentioned pulley shafts on the pivotal mounting, said means pivotally mounting the pulley unit shafts including a strap-like metal bracket having one end thereof pivotally mounted on said support for swinging movement of the bracket toward and away from the driving shaft, the pulley units being carried by the bracket, and the bracket having means co-acting with means on said support to limit pivotal movement of the bracket and to hold the latter in an angularly adjusted position.

3. A variable speed power take-off as defined in claim 2 wherein the means pivotally mounting the pulley shafts includes a pair of arms carrying the respective pulley shafts and mounted on the bracket for angular adjustment relatively to one another so that the pulley shafts may be adjusted toward or away from one another.

4. A variable speed power take-off as defined in claim 3 wherein the means for effecting pivotal adjustment of said pulley shafts is manually operable, and includes a screw member cooperating with a nut member, one of said members being rotatable and axially fixed and the other member being angularly fixed but movable bodily.

References Cited in the file of this patent

UNITED STATES PATENTS

| 2,311,993 | Olsen | Feb. 23, 1943 |
| 2,351,148 | Rafter | June 13, 1944 |
| 2,638,005 | King et al. | May 12, 1953 |
| 2,881,624 | Cardona | Apr. 4, 1959 |